Dec. 17, 1935.  E. E. HIGHFILL  2,024,858
WARNING LIGHT
Filed July 27, 1934
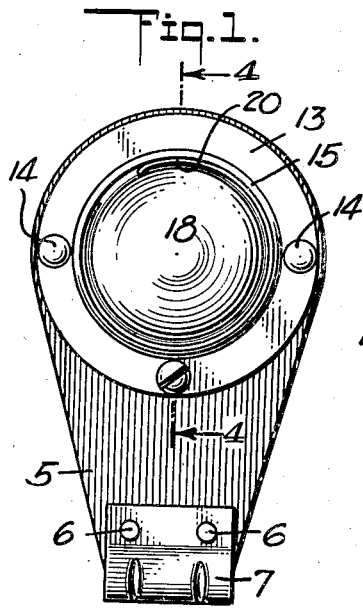
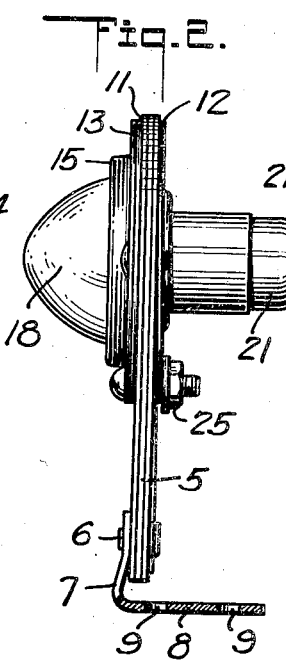
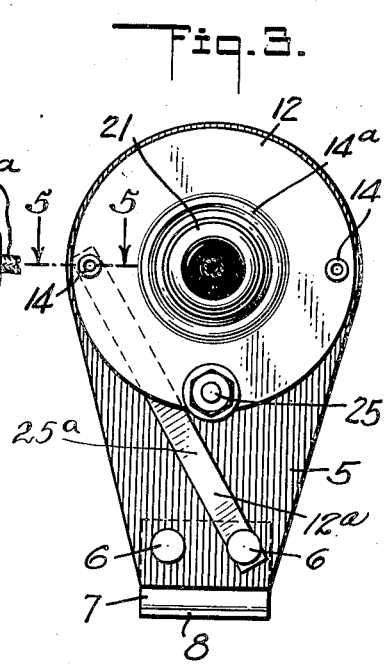
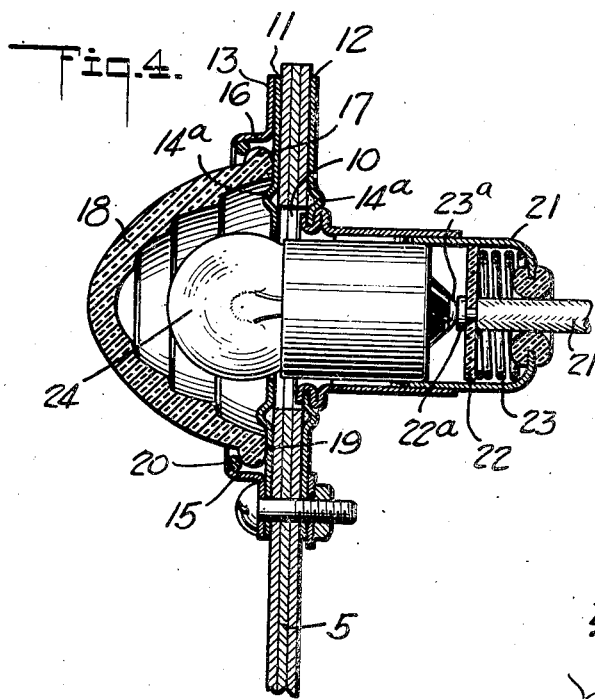
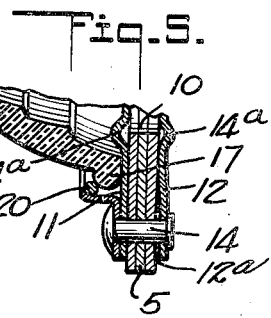
Inventor:
Ernest Earl Highfill, Dec'd,
by Jennie Edna Highfill,
Admx.
BY
Mercer, Anderson & Liddy
ATTORNEYS.

Patented Dec. 17, 1935

2,024,858

UNITED STATES PATENT OFFICE 2,024,858

WARNING LIGHT

Ernest Earl Highfill, deceased, late of Los Angeles, Calif., by Jennie Edna Highfill, administratrix, Los Angeles, Calif.

Application July 27, 1934, Serial No. 737,316

REISSUED

3 Claims. (Cl. 240—8.3)

This invention relates to warning lights of the class designed particularly for application to the rear ends of trucks and trailers and to be employed as a means enabling the road clearance between the truck and an adjacent side of a roadway to be readily discerned by approaching drivers from behind, and an object is to provide a simple and exceedingly effective form of support on which the lamp is mounted, whereby to prevent premature breakage of the filament of the lamp incident to the effect of sudden harsh shocks and jars imparted thereto, the support being of a springy or resilient nature and, aside from functioning as set forth, may readily flex and not be injured when brought into wiping contact with any object that may reside in its path.

Another object is to simplify the construction of such devices and to provide a small number of co-operable parts that can be quickly assembled.

A further object is to provide a device of this character wherein simple and positively acting means are employed for forming a ground connection between the metallic lamp housing of the device and the chassis of the vehicle on which the device is mounted.

With the above and other objects in view, which will appear as the nature of the invention is better understood, the same consists in the improved construction and novel arrangement of parts which will hereinafter be fully described and particularly pointed out in the claims.

In the accompanying drawing has been illustrated a single and preferred form of the invention, it being, however, understood that no limitations are necessarily made to the precise structural details therein exhibited, but that changes, alterations and modifications within the scope of the claims may be resorted to when desired.

In the drawing

Figure 1 is a view of a warning light in front elevation;

Figure 2 is a view of the warning light in side elevation;

Figure 3 is a view of the warning light in rear elevation;

Figure 4 is an enlarged vertical sectional view on the line 4—4 of Figure 1;

Figure 5 is a fragmentary sectional view on the line 5—5 of Figure 3.

In carrying the invention into practice, use is made of a support 5 constructed preferably from non-metallic flat strip material such as multi-ply canvas, in which the plies are vulcanized to each other. The support has riveted thereto at 6 an angular metal bracket 7 whose flange 8 is formed with openings 9 whereby the bracket can be secured in the desired position to the chassis or some other metallic part of the vehicle.

The support 5 has an opening 10 passing therethrough and co-operable therewith is a lamp housing consisting of a set of annuli 11, 12 and 13, between the one of which designated 11 and the one designated 12 the flat strip material 5 is interposed in a manner to axially aline its opening 9 with said annuli.

The anulus 12 of the set employed is situated outwardly of the annulus 11 and the latter inwardly of the annulus 13 and, as illustrated, all of these annuli are secured together and to the strip 5 by rivets 14.

All of the annuli 11, 12 and 13 are of the same diameter, the annuli 11 and 12 being substantially identical and, except for the annular strengthening beads 14a, which are upset therefrom, they are substantially flat. This is to enable them to be firmly clamped against the opposite sides of the strip 5. The annulus 13 is formed with a lens mounting 15 which consists of an annular flared flange 16 which embraces the flanges 17 of a conical lens 18. The flat face 19 of the flange 17 is firmly seated against the adjacent flat face of the annulus 11 and held thereby the split ring 20, the latter being removably contained in the space between the lens and the inner wall of the aforesaid flange 16. On reference to Figure 4 of the drawing, it will be observed that a considerable portion of the annulus 11 is disposed in back of the lens 18, and this surface is preferably polished or silvered, or the annulus otherwise formed to provide a light reflector.

An electric lamp socket 21 constitutes a part of the aforementioned lamp housing and passing therethrough is a conductor wire 21a having at its end within the socket a disk 22. From one side of the disk is exposed a circuit-making contact element 22a. A coiled spring 23 is contained in the socket, and operatively bears against the disk to force the contact element 22a thereof against the contact element 23a of an electric light bulb 24. This bulb is effectively disposed in front of the reflector surface of the annulus 11 and is, therefore, partly contained in the hollow of the lens.

A strip of flexible metallic tape 12a extends from between the annulus 12 and the strip 5 and is secured at one end to the bracket 7 by one of the fastening rivets 6. The other end of the tape is secured to one of the rivets 14 beneath the annulus 12, whereby a ground connection is formed between the bracket 7 and said lamp socket, while permitting the support 5 to yield should the light be struck. In some instances it may not be possible to mount the device directly upon some metallic part of the body of the vehicle, and to thus enable a proper ground connection to be formed between the socket and some other metallic part of the vehicle there is provided a binding post 25, the latter passing through the support 5 and the respective annuli 11, 12 and 13. To this post a wire may be run from the metallic part that established the ground connection.

The form of device herein shown and described is such that sudden shocks and jars that are imparted thereto will be largely absorbed by the flexible and more or less springy and resilient support 5, thus preventing premature breakage of the filament of the lamp. In addition thereto, the support is of a construction to enable the lamp to be effectively displayed from the vehicle. Because of the positions in which such devices are by law compelled to be mounted upon a vehicle, they are, at some time or other, liable to accidentally contact with various obstructions, such as passing vehicles or fixed objects of one sort or another. It follows, from the flexible nature of the support 5, that should it be accidentally brought into contact with obstructions, it will merely flex or be temporarily shifted from its intended display position and will readily return to its normal position, as will be appreciated.

What is claimed is:

1. A warning light comprising a flat strip of resilient self-supporting material having an opening extending therethrough, annuli disposed at the opposite sides of the strip in alinement with the opening, means for rigidly clamping the annuli to the strip and to each other, an electric lamp socket secured to one annulus and in a position to dispose a lamp in the opening, and a lens removably secured to the other annulus to enclose the lamp.

2. A warning lamp comprising a pair of alined annuli, a light reflector disposed at the inner face of one of the annuli, an electric lamp socket carried by the other annulus for disposing a lamp in front of the reflector, a support of resilient strip material interposed between said other annulus and the reflector and secured to both annuli and the reflector, and a lens detachably secured to said one of the annuli to enclose the lamp.

3. A warning light comprising a support of resilient, non-metallic, flat strip material having an opening therethrough at one end; a metallic attaching bracket at the opposite end of the support on which the support is adapted to freely yield in response to shocks and jars imparted thereto; a lamp housing including a pair of annuli between which said one end of the support is clamped with the openings in the latter and said one of the annuli coinciding; means by which a lamp is adapted to be mounted in the other annulus to project through said openings; and a lens detachably secured to the lamp housing to enclose the lamp.

JENNIE E. HIGHFILL,
*Administratrix of the Estate of Ernest Earl Highfill, Deceased.*